United States Patent
Arnold et al.

(10) Patent No.: US 6,393,897 B1
(45) Date of Patent: May 28, 2002

(54) ACCELERATED LEAKAGE TESTING

(75) Inventors: William Allen Arnold, Akron, OH (US); John Morris Chapman, Steinsel (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/668,115

(22) Filed: Sep. 22, 2000

(51) Int. Cl.$^7$ ................................................. G01M 3/04
(52) U.S. Cl. ............................................................. 73/40.7
(58) Field of Search .......................................... 73/40.7

(56) References Cited

U.S. PATENT DOCUMENTS

| | | | | |
|---|---|---|---|---|
| 3,577,769 A | * | 5/1971 | Roberts | 73/40.7 |
| 3,721,117 A | * | 3/1973 | Ford et al. | 73/40.7 |
| 3,672,212 A | * | 10/1973 | Morley et al. | 73/40.7 |
| 4,754,638 A | * | 7/1988 | Brayman et al. | 73/40.7 |
| 4,813,268 A | * | 3/1989 | Helvey | 73/40.7 |
| 5,010,761 A | * | 4/1991 | Cohen et al. | 73/40.7 |
| 5,625,141 A | * | 4/1997 | Mahoney et al. | 73/40.7 |
| 5,850,036 A | * | 12/1998 | Giromini et al. | 73/40 |
| 6,029,716 A | * | 2/2000 | Hawk | 141/38 |

FOREIGN PATENT DOCUMENTS

| | | | | |
|---|---|---|---|---|
| EP | 0165342 A1 | * | 12/1985 | 73/40.7 |
| GB | 200300 A | * | 1/1979 | 73/40.7 |

* cited by examiner

Primary Examiner—Hezron Williams
Assistant Examiner—Michael Cygan
(74) Attorney, Agent, or Firm—David E Wheeler

(57) ABSTRACT

In determining the integrity of a fluid containing system, testing for integrity can be accelerated by injecting a first fluid into the system that is less viscous, or has a smaller molecular or atomic size or weight than a second fluid for which the system was designed, and measuring its rate of escape from the system. In an illustrated embodiment, helium is substituted for air in testing the leakage or diffusion rate of tires. As it escapes from the system, the first fluid is trapped in a container, which surrounds the system, and is detected using a sensor adapted for that purpose. The rate of leakage or diffusion of the first fluid is measured, and the rate data is used to estimate the rate of leakage or diffusion of the second fluid from the system.

5 Claims, 3 Drawing Sheets

ACCELERATED LEAKAGE TESTING

FIELD OF THE INVENTION

The present invention relates to a method and apparatus for testing fluid containing systems for leakage or diffusion

BACKGROUND OF THE INVENTION

It is desirable to test the integrity of systems which are designed to retain fluids. For example, in the making of pneumatic tires, if the innerliner does not completely cover the inside surface of the carcass, or if the compound used to make the innerliner does not have the proper air permeability, or if the bead area of the tire has a defect or deformity, the tire may not be capable of retaining air for a suitable period of time. Accordingly, to assure product quality, a specific number of tires from a tire build are subjected to an air retention test. Conventional air retention testing, however, takes sixty or more days to complete. Therefore, if excessive air loss rates exist in a specific tire build, this may not be discovered for two months or more, and a problem may be repeated in subsequent tire builds. There is a need in the art to accelerate tire testing, and the testing of all such systems that depend on the containment of a fluid for its use.

In 1828 Thomas Graham performed experiments studying the rates at which different gases flowed through a small orifice from a container into a vacuum. This phenomenon is called effusion. He discovered that the rate of effusion of a gas varied inversely as the square root of its relative density. The ratio of the relative densities of two gases measured under the same condition is equal to the ratio of their molecular weights. This is expressed as:

$$\frac{\text{rate of effusion } A}{\text{rate of effusion } B} = \left(\frac{MW_B}{MW_A}\right)^{1/2} \quad (1)$$

More recently, the American Vacuum Society has outlined AVS standards in defining and testing of mass spectrometer leak detectors. In these vacuum standards they define a leak as "a hole, porosity, permeable element, or other structure in the wall of an enclosure capable of passing gas from one side of the wall to the other under the action of pressure or a concentration difference existing across the wall." The AVS also defines a molecular leak as "a leak through which the mass rate of flow is substantially proportional to the reciprocal of the square root of the molecular weight of the flowing gas." If a leak is molecular, then the AVS recommends that the "equivalent standard air leak rate" (air: mol. wt. 29) be taken as $(4/29)^{1/2}=0.37$ times the measured helium (mol. wt 4) leak rate. In other words, helium will leak 2.7 times faster than air in a molecular leak. It is interesting to note that the leak rate is dependent on molecular weight rather than molecular size, as helium, nitrogen, and oxygen have van der Walls radii of 1.33, 1.57, and 1.47 angstroms, respectively. Because helium is much lighter than either nitrogen or oxygen, the speed of the helium atom is much greater than the speed of the oxygen and nitrogen molecule in atmospheric conditions.

It is an object of this invention to provide a method and apparatus whereby fluid retention in pressurized systems can be tested rapidly.

Other objects of the invention will be apparent from the following description and claims.

SUMMARY OF THE INVENTION

A method of accelerating testing of a fluid containing system for leaks comprises the steps of (a) providing a sealable container having an internal volume and a shape approximating the volume and shape of a system to be tested for leaks, where the sealable container has a volume of 105% to 1600% of the total volume of the system, (b) filling the system with a known amount of a first fluid having a molecular size or weight less than the molecular size or weight of a second fluid which is normally contained within the system, or a viscosity less than the viscosity of the second fluid, (c) placing the system within the internal volume of the sealable container and sealing the container, (d) creating a pressure differential between the system and the internal volume of the sealable container, wherein fluid used to pressurize the container is different from the fluid used to pressurize the system, (e) monitoring the interior of the container for the presence of the first fluid.

In an illustrated embodiment, the method further comprises the steps of determining the rate of diffusion of the first fluid from the system to the internal volume of the container; and calculating the rate of diffusion of the second fluid from the container based on a factor (f) which describes the difference in diffusion rate of the two fluids in the system.

When the fluid is a gas, the rate of diffusion is calculated using the formula $$b^* = (dC/dt)\left[\frac{(V_c - V_E)RT}{PfV_I}\right]$$

wherein b* is the predicted rate of loss of said second fluid by the system;

dC/dt is the test fluid concentration build-up rate in the container $V_C$ is the volume of the container;

$V_E$ is the exterior volume of the test system;

R is the gas constant;

T is temperature in Kelvin;

P is absolute pressure of test fluid in the system;

$V_I$ is the internal volume of the system; and f is the factor by which test fluid is leaking at a different rate than system fluid (a ratio) where the rate of the test gas is the numerator.

In the illustrated embodiment, the system is a tire and the system fluid is air, and the method comprises the further steps of selecting the first fluid to be helium, and detecting and monitoring the presence of helium in the internal volume of the container using a mass spectrometer. The presence of the first fluid in the internal volume of the container is monitored and the rate of diffusion is calculated using a Fortran program.

Also provided is an apparatus for measuring the leakage rate of a system comprising a sealable container made of diffusion resistant material and comprising a size and shape suitable for enclosing the size and shape of a system to be tested, a monitoring device adapted to detect the presence and quantity of specific molecules associated with the container, and data collection means for collecting data and calculating the leakage rate of interest.

In the illustrated embodiment, the monitoring device is a mass spectrometer, and the data is collected using a personal computer.

DETAILED DESCRIPTION OF THE INVENTION

Figure 1:
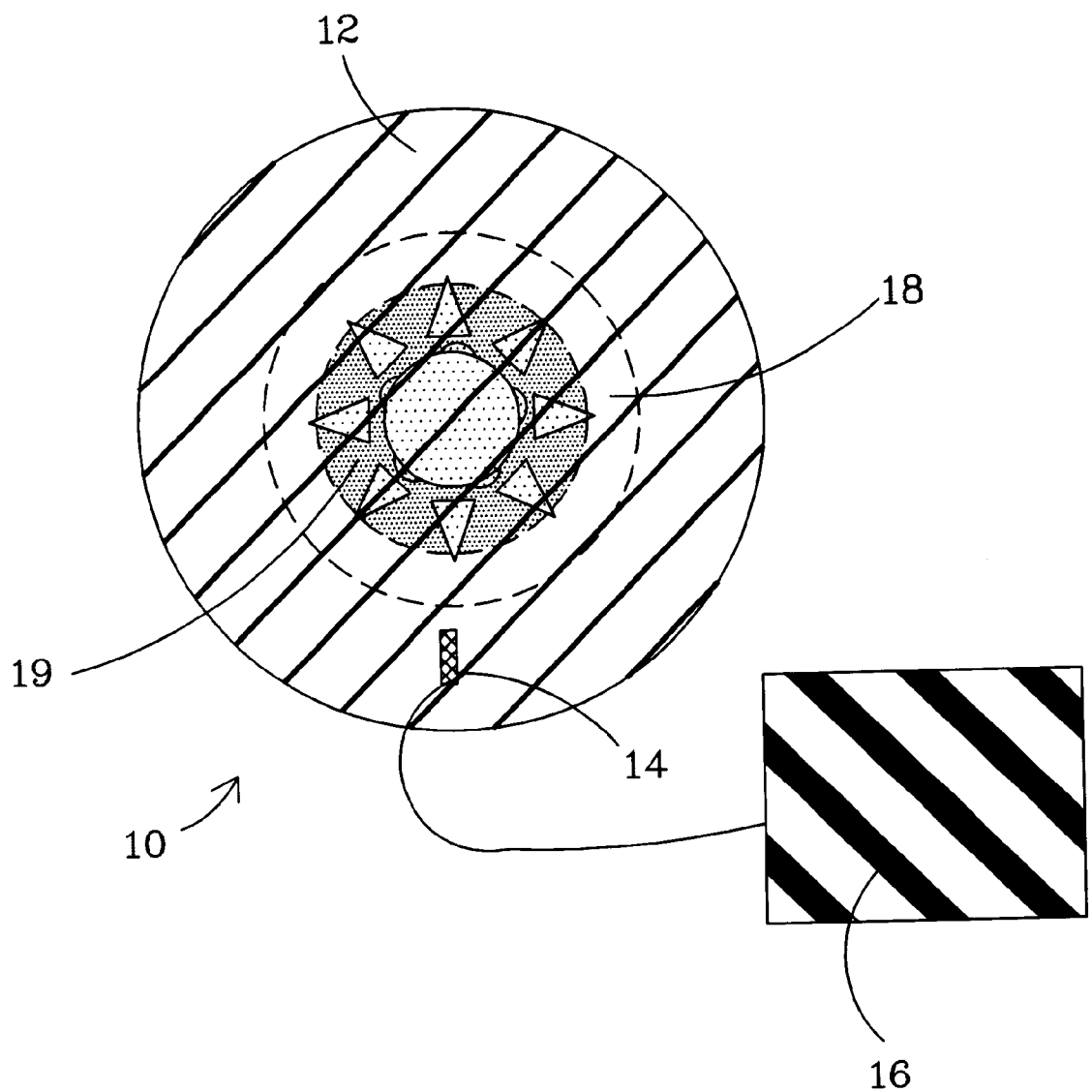
FIG. 1 illustrates an apparatus of the invention that can be used in a method of accelerating leakage tests on a pressurized system.

In an illustrated embodiment, an experimental set-up was made to measure the helium leak rate in tires. The set-up consists of a helium sniffer (mass spectrometer) and an airtight metal (aluminum) vessel. A tire filled with helium can be placed into the vessel and the dilute helium concentration in the vessel can be measured as the tire off-gasses. The helium concentration build-up rate can then be calibrated against a measured air leak rate. The air leak rates of other tires of the same general construction can then be predicted using their measured helium leak rates.

Although accelerated air retention tests using helium have been proposed in the past, no satisfactory method, prior to the present invention, has been developed to make such accelerated testing practical.

Although the present invention is described specifically for determining air retention properties, i.e., the leakage or diffusion rate in tires, those skilled in the art will recognize that the method can be used on other types of products or systems using the same basic steps and procedures.

Air comprises approximately 78% nitrogen, 21% oxygen, 0.9% argon, and 0.03% carbon dioxide, and trace amounts of the inert gases neon, helium, krypton, xenon, and radon. Nitrogen ($N_2$) and oxygen ($O_2$) are relatively large and heavy molecules. The diffusion rate of a fluid, such as oxygen or nitrogen, is dependent on the size of a molecule of the fluid, the weight of the molecule, and the physical interaction between the molecules, such as Van der Waals bonding, etc. Although air contains some water vapor, i.e. $H_2O$, induced bonding between molecules of air is considered to be negligible, and accordingly, the diffusion rate of air molecules is substantially dependent on the size and weight of the molecules.

As discussed in the background of the invention, for a gas the leakage rate can be primarily dependent on the weight of the molecule. However, the leakage of a gas from a tire can be much more complicated.

In order to bring a test to termination, although some extrapolation can be made if a steady increase/decline in diffusion rate is observed, it is more accurate for testing if a steady rate of diffusion is achieved. Assuming there are no large leaks, the diffusion coefficient of the test gas in the material of the system primarily determines the amount of time it takes for the diffusion of gas to reach a steady state of diffusion. A gas that has a small diffusion coefficient in the material that makes up a system usually does not make a good test gas.

In the conception of the present invention, the inventors realized that if a system that is designed to contain a specific gas under pressure is filled with a gas which has a high diffusion rate in the system, leakage or diffusion from the system should be accelerated at a rate proportional to the ratio of the diffusion rates of the system gas and the test gas, making detection easier.

For example, although $CO_2$ has a high solubility and a high permeability in butyl rubber, its diffusion coefficient is similar to air, and the time it takes to reach a steady diffusion rate should be similar to air, making it an unsuitable gas for accelerated testing of the diffusion rate of butyl rubber.

Helium, on the other hand, has a low solubility and a high diffusion rate in butyl rubber, and although the permeability of helium in butyl rubber is better than $CO_2$ by less than a factor of two, it has been found that helium is a suitable test gas, whereas parameters which would make $CO_2$ a suitable test gas are not as yet known.

Uses of the invention may include checking air leaks in alloy rims, to check the valve stems and center pins of the valve stems in the rim, and as part of laboratory tests to determine the diffusion properties of compounds that may be used in composites that are used to retain fluids, such as tires and air springs, and as a means of testing the permeability of rubber compounds that are candidates for use in such products, and as a quality control tool for these and similar products and systems. Other uses of the invention will be apparent to those skilled in the art.

In the illustrated embodiment of the invention, the inventors proposed to fill a tire with a known amount of helium, in place of air, in order to accelerate the rate of leakage or diffusion from the tire, and to estimate the air retention properties of the tire. Pure helium, or a mixture of helium with other gases, can be used. If a known amount of helium is mixed with air, for example, the rate of diffusion of the helium portion can be used to calculate the leakage or diffusion rate of the tire.

Gas leakage out of a tire is much more complicated than leakage out of a simple rubber vessel, because a tire is a composite structure made of a number of parts, layers, and subassemblies which provide a number of gas leak routes. Mass transfer within a tire is almost certain to be anisotropic.

Two tires of size P185/70R14 were used for the initial tests. Proper testing procedures and a typical time to reach a diffusive steady state were determined.

It was found that:

The helium build-up rate in the sealed container was nearly linear, as predicted by theory. The build-up rates varied about 1% day-to-day for a given tire.

The predicted air loss rates were within 10% of the measured air leak rates.

The inventors have found that air retention properties can be estimated in about two days when a tire is filled with helium, as opposed to the sixty or more days required to test air retention properties.

Figure 3:
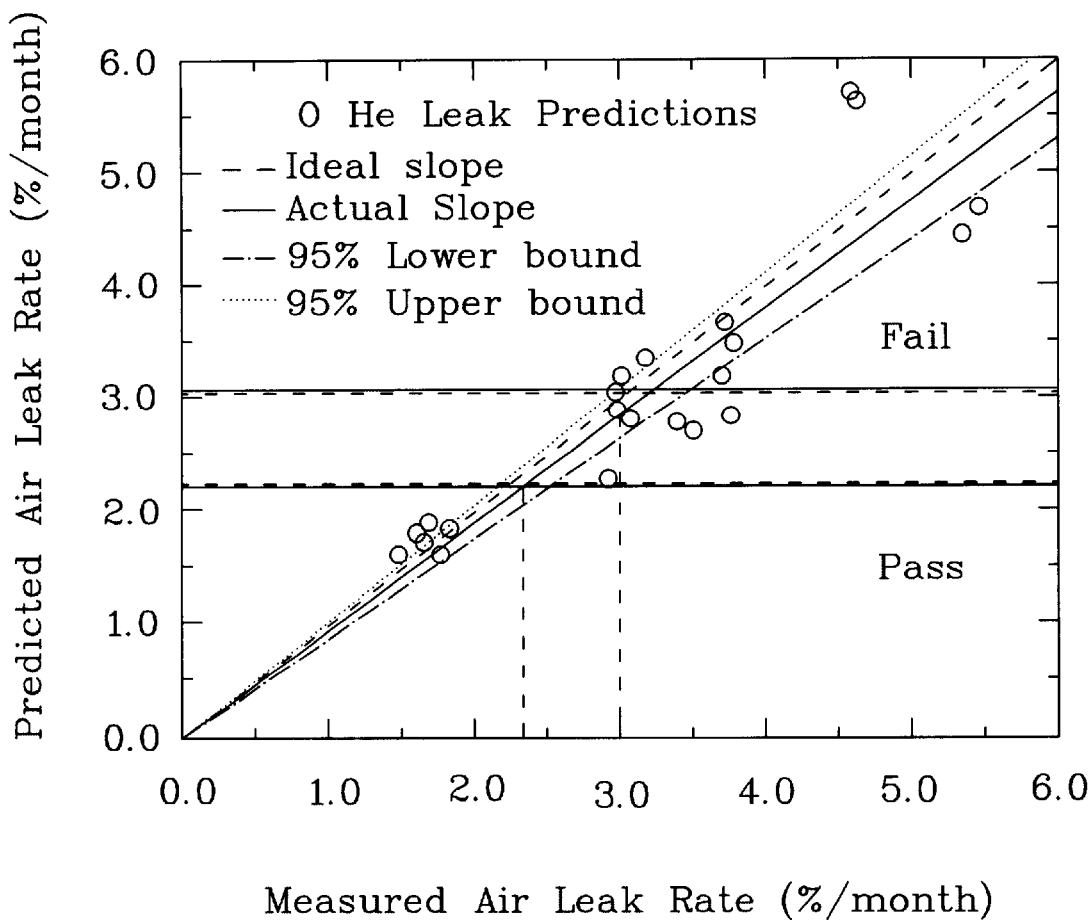
FIG. 3 illustrates a correlation of a predicted air leak with measured air leaks in specific tires.

Based on this preliminary work, it was decided to do more extensive testing on a larger number of tires. The results are shown in FIG. 3 as described below.

With reference now to FIG. 1, in accordance with the method of the invention, an apparatus (10) has been developed as part of the present invention which is designed specifically for testing the air retention properties of tires. The apparatus (10) comprises a sealable container (12) which is designed to be substantially leak-proof for all components of air. In the illustrated embodiment, container (12) is made of a metal, specifically aluminum. Apparatus (10) may be connected to an evacuating system (not shown) for reducing the pressure in container (12), or the container may be used at atmospheric pressure when testing tires. Container (12) has associated therewith a collector (14), which is connected to a sensor (16) (a helium sniffer).

In the illustrated embodiment of the invention, tire (18) is inflated with helium and sealed within container (12). As helium diffuses from tire (18) into container (12), the concentration of helium in container (12) increases, and that increase, and the rate of increase, can be detected by sensor (16), which in the illustrated embodiment is a mass spectrometer.

Those skilled in the art will recognize that any suitable fluid can be used in the test of the invention, as determined by the technician/engineer for a particular test. For testing tires in the specific embodiment described, to achieve suitable acceleration of the test, and for safety reasons, helium is the preferred test gas.

Air retention testing assumes pressure to be given by:

$$P = P_o e^{-bt} \tag{2}$$

where b is the air loss rate (expressed as a positive quantity) and $P_o$ is the initial gauge pressure. Taking a derivative of equation (2) at time t=0 gives:

$$dP/dt = -bP_o \tag{3}$$

The hypothesis that helium will leak out at a certain factor, here denoted f, faster than air implies a helium retention model:

$$P = P_o e^{-fbt} \tag{4}$$

However, because the helium partial pressure is near zero in air, $P_o$ in the helium retention model is the absolute pressure. The derivative of equation (4) at time t=0 is;

$$dP/dt = -fbP_o \tag{5}$$

Accordingly, helium will leak from a tire at a certain factor f faster than air. The actual value of f will vary from tire to tire build. However, if f can be determined as a function of tire construction variables (such as liner composition, liner ending position, and liner gauge) then prediction of air loss rates is possible for each tire construction.

Although it is important only that the pressure within container (12) is different from the pressure within tire (18), to determine a flow rate to or from tire (18), it is convenient to inflate tire (18) to its specified inflation pressure while maintaining container (12) at atmospheric pressure, i.e. 14.7 psig (pounds per square inch absolute). In the embodiment wherein container (12) is evacuated, for ease of calculation, it may be desirable to inflate tire (18) to 14.7 psi less than its specified inflation pressure.

Those skilled in the art will recognize that in order for the test to be meaningful, tire (18) should be mounted on a rim (19) that meets the specifications for a rim on which the tire will be mounted on a vehicle.

Figure 2:
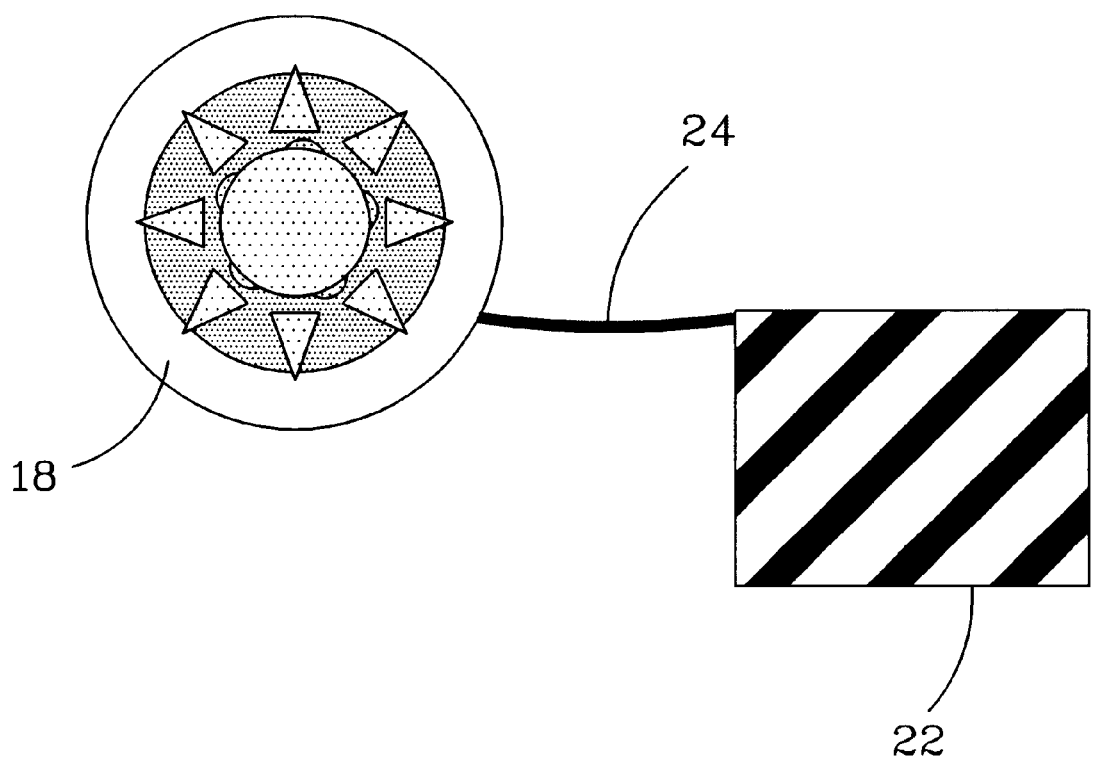
FIG. 2 illustrates an apparatus for determining the volume of a pressurized system accurately.

In the air leakage tests, after the helium loss rate has been determined over a two day period, this rate must be converted into a predicted air loss rate. This conversion is made in the formula $$b^* = (dC/dt) \left[ \frac{(V_c - V_E)RT}{PfV_I} \right] \tag{6}$$

wherein
dC/dt is the test gas concentration build-up rate in the container,
$V_C$ is the volume of the container,
$V_E$ is the external volume of the system,
R is the gas constant,
T is temperature in Kelvin,
P is the absolute pressure of test gas (helium) in the system (tire),
f is the factor by which test gas is leaking different than air, and
$V_I$ is the system's internal volume, In order for this calculation to be meaningful, $V_I$ (the tire's internal volume) must be determined very accurately. To make this determination, the device illustrated in FIG. 2 is used whereby the volume of tire (18) is determined. In the illustrated embodiment of the method, the tire is maintained at 4 psi, and is joined through conduit (24) to a rigid container (22) having a known volume, and is charged with air at a known pressure. The tire is allowed to reach equilibrium with container 22, and the final air pressure in the tire (18) and container (22) are measured. The accurate volume of the tire is then determined by the formula $$V_I = V_T \left[ \frac{P_T - P_F}{P_F - P_I(V_I'/V_I)} \right] \tag{7}$$

wherein
$V_I$ is the internal volume of the tire after equilibration,
$V'_I$ is the internal volume of the tire at 4 psig,
$V_T$ is the internal volume of the tank,
$P_T$ is the initial absolute pressure of the tank,
$P_F$ is the final absolute pressure of the tank and tire system,
$P_I$ is the initial absolute pressure of the tire (at 4 psig).

In the apparatus of the invention, the mass spectrometer (16) (i.e. the helium sniffer) used was a Veeco Model MS40, which has the ability to detect 0.05 ppm (parts per million). Typically, concentrations of helium in the container during the test will be in the range of 5 to 2000 ppm.

The mass spectrometer with a sniffer probe can be used to determine the concentration of helium in air. The normal background level of helium in air is about 5 PPM. The output of a commercially available sniffer is in the units of std cc/s. The normal background concentration in air produces a reading of about 1 to $2 \times 10^{-6}$ std cc/s. The background concentration reading of He is used in the analysis. The maximum measurable concentration is about 3000 PPM.

Although algorithms used to collect and collate this type of data are well characterized in the art, special factors were written into the program to make it suitable specifically for collecting data for tires, as illustrated in copending application Ser. No. 09/668,116 filed of even date herewith.

The inputs to the code are the measured helium build-up rate, the ambient helium reading, the absolute tire pressure, the internal and external tire volumes, the internal container volume, and the liner butyl content, gauge and ending position. This correlation makes possible calculation of the rate "f" at which helium leaks out of the tire faster than air. This correlation determines the rate "f" as a function of inner liner composition (%Butyl), inner-liner gauge, and inner-liner ending position (for instance, toe+0.5"). Once "f" is determined, it can be used to predict the air leak rate from other tires given the inner-liner composition, gauge, and ending position.

A Sun Microsystems workstation Ultra 60 was used to collect the data.

In the development of the invention, the inventors carried out repeatability tests to determine the accuracy of the method, and quantified error rates on air loss and helium buildup rates. The inventors also checked the validity of the model by measuring helium leak or diffusion rates at different pressures. The inventors already knew that air retention tests typically required about 30 to 40 days to reach a substantially steady leak rate, and measured the initial helium leak rate for six (6) days and established that the time needed to reach a steady state was typically within two (2) days. The inventors correlated the predicted air rate loss based on the helium data with actual measurements of the air rate loss from the same tires.

This is an indirect method to measure the helium leaking from a tire. A tire filled with helium is placed in a sealed container, and the helium build-up rate in the container is measured. The measured helium build-up rate is then related to the air loss rate. The determination assumes:

the container volume $V_c$ is constant the gas behaves ideally the helium concentration in the container is dilute isothermal conditions The predictions are shown in FIG. 3 as a function of the measured air leak rates. The 24 data points represent 19 different tires and 5 repeats. Of the 19 different tires, 18 were passenger and one was a convenient spare. A linear regression through the origin of the data was performed. Ideally, the fit would have a slope of 1.000. The actual slope of 0.95 was slightly less than the ideal. Also shown are the 95% confidence bands on the regression.

The slope of the line was determined by forcing the best straight line of the data points to -0-. The statistical 95% limits on the slope were determined using the data points. General Motors guidelines, i.e., the GM percentage of leakage per month requirements were used to set the pass/fail limits.

To define the pass and fail criteria of the predictions, the 2.47% GM pass criteria on the measured leak rate axis was used as a starting point and a vertical line was drawn up to the lower bound, at which a horizontal line was drawn. Anything below this line should pass. Likewise, a vertical line was drawn from 3.0% (GM fail criteria) on the measured leak rate axis up to the upper bound, at which a horizontal line was drawn. Anything above this line should fail. Both pass and fail are shown as bold dashed horizontal lines in FIG. 3. Tires with predicted air loss rates in between these two lines should be tested by conventional means.

The estimated air leak or diffusion rate was determined by the calculation described above based on the helium leak or diffusion rate data obtained. This data was compared with actual data from air leak or diffusion tests. Prediction data correlated well with actual air retention data.

Thus, the air retention rate can be predicted by using the measured helium leak rates and measured or known volumes.

Some margin for error has been provided by reducing the limits to pass the tests to 2.25% per month.

The invention is further illustrated with reference to the following example.

EXAMPLE

An indirect method to measure the helium leak rate in the tires was employed. A large aluminum airtight cylindrical container, 3 feet in diameter and 1.5 feet tall was constructed. Tires were deflated to 5 psig, then inflated to 35 psig a minimum of 4 times with helium. Purging 6 times insures that the tire is inflated with 99+% helium. Transient studies were performed to determine that the tires reached a diffusive steady state. Prior air retention tests required that the tires sit 10 days to insure a diffusive steady state. It has since been found that the 10 day period actually was needed for some stabilization of a rate that never obtains a true steady state, but does achieve a rate suitable for calculations on a pass/fail basis.

For the purpose of measuring the diffusion rates, the non-dimensional time scale is given by $$t^* = \left(\frac{t_{He}D_{He}}{l^2}\right) = \left(\frac{t_{air}D_{air}}{l^2}\right)$$

where D is the effective diffusion coefficient ($D_{He} > D_{air}$), and where l is the characteristic length scale. The concentration cannot be measured continuously over this time scale due to the concentration building to a level exceeding the machine capability. Linearity and day-to-day repeatability were the indicators used in this study to determine steady state. Theory predicts that at a diffusive steady state the concentration in the container increases as a linear function of time.

The helium concentration build-up rates can be correlated to the air pressure loss rates as described in the Detailed Description of the Invention above. The rate at which the helium builds up in the container will vary with tire size due to the tires occupying different volumes in the container.

To test the time needed to reach a diffusive steady state, a tire was filled with helium to 35 psig and purged 4 times. The helium concentration build-up in the container on the first day was fitted well by a quadratic. By the second day the concentration build-up was a linear function of time. There was little difference between the second and sixth day, indicating that a diffusive steady state was reached within about one day. The reported slopes day-to-day were within 1%. Statistically, the standard error was a maximum of 1.07E-8 std cc/s-min for the data. With 8 degrees of freedom, the 95% confidence bounds, using day 5, are between 3.78 and $4.28 \times 10^{-7}$ std cc/s-min. The confidence bounds are about +/−6% of the reported slopes.

The helium leak rates were measured for two tires. Each tire was tested twice. As a preliminary measure, the beads, pressure transducer tubes, and value stems were checked for leakage. No excessive leaks were found and the small amount of leakage that was detected was on the order of that diffusing through the tire itself.

Calibration of the VEECO MS40 is a major factor in accurately measuring helium build-up rates. Calibration checks should be performed often and recalibration should only be done when necessary as dictated by the VEECO manual. The gain factor G2 on the VEECO MS40 helium sniffer is important for defining test procedures and should be recorded during each test. It was noted that this value was very low during the first hour after turning on the machine. Values as low as 1.02 were encountered. After 1 hour the calibration constant G2 was typically in the 1.1 to 1.3 range. Therefore, calibration should only be done after a warm-up period of about one hour.

It is recommended that the calibration of the helium leak detector be checked at least every few hours for these experiments. The VEECO MS40 was modified so that this could be done without disturbing an experiment in progress. It is further recommended that the VEECO MS40 warm-up for at least 1 hour before a calibration check, recalibration, or tuning is done.

While the invention has been specifically illustrated and described, those skilled in the art will recognize that the invention may be variously modified and practiced without departing from the spirit of the invention. The invention is limited only by the scope of the following claims.

What is claimed is:

1. A method of accelerating testing of a fluid containing system for leaks, said method comprising the steps of
   (a) providing a sealable container having an internal volume and a shape suitable for containing the volume and shape of a system to be tested for leaks, where said sealable container has a volume of 105% to 1600% of the total volume of said system;

(b) filling said system with a known amount of a first fluid having a molecular size or weight less than the molecular size or weight of a second fluid which is normally contained within said system, or a viscosity less than the viscosity of the second fluid;

(c) placing said system within the internal volume of said sealable container and sealing said container;

(d) creating a pressure differential between said system and the internal volume of said sealable container, wherein fluid used to pressurize said container is different from the fluid used to pressurize said system;

(e) monitoring the interior of said container for the presence of said first fluid;

(f) determining the rate of diffusion of said first fluid from said system to the internal volume of said container; and (g) calculating the rate of diffusion of said second fluid from said container based on a factor (f) which describes the difference in diffusion rate of the two fluids in the system.

2. The method of claim 1 further comprising the further steps of monitoring the presence of said first fluid in the internal volume of said container and calculating the rate of diffusion using a Fortran program.

3. The method of claim 1 wherein the fluid is a gas, and the rate of diffusion is calculated using the formula $$b^* = (dC/dt)\left[\frac{(V_c - V_E)RT}{PfV_I}\right]$$

wherein $b^*$ is the predicted rate of loss of said second fluid by said system;

dC/dt is the test fluid concentration build-up rate in the container $V_C$ is the volume of the container;

$V_E$ is the exterior volume of the test system;

R is the gas constant;

T is temperature in Kelvin;

P is absolute pressure of test fluid in the system;

$V_I$ is the internal volume of the system; and f is the factor by which test fluid is leaking at a different rate than the system fluid.

4. The method of claim 1 wherein said system is a tire said system fluid is air, and said method comprises the further steps of (h) selecting said first fluid to be helium; and (i) detecting and monitoring the presence of helium in the internal volume of said container using a mass spectrometer.

5. An apparatus of measuring the leakage rate of a system comprising (a) a sealable container made of a diffusion resistant material and comprising a size and shape suitable for enclosing the size and shape of a system to be tested;

(b) a monitoring device adapted to detect the presence and quantity of specific molecules associated with said container; and (c) data collection means for collecting data and calculating the leakage rate of interest, wherein the data collection means is a personal computer and the calculating means is a Fortran program which calculates the rate of diffusion of a second fluid based on the measured rate of diffusion of a first fluid based on a factor (f) which describes the difference is diffusion rate of the two fluids in the system.

* * * * *